(12) United States Patent
Lee et al.

(10) Patent No.: US 8,630,413 B2
(45) Date of Patent: Jan. 14, 2014

(54) DIGITAL CONTENTS REPRODUCING TERMINAL AND METHOD FOR SUPPORTING DIGITAL CONTENTS TRANSMISSION/RECEPTION BETWEEN TERMINALS ACCORDING TO PERSONAL USE SCOPE

(75) Inventors: Jooyoung Lee, Seoul (KR); Hyon-Gon Choo, Daejon (KR); Jeho Nam, Seoul (KN); Moon-Kyun Oh, Daejon (KR); Sang-Kwon Shin, Daejon (KR); Won-Sik Cheong, Daejon (KR); Sangwoo Ahn, Daejon (KR); Jin-Woo Hong, Daejon (KR); Byoung-Soo Koh, Gyeonggi-do (KR)

(73) Assignees: Electronics and Telecommunications Research Institute, Daejon (KR); Digicaps Co., Ltd., Seoul (KR)

( * ) Notice: Subject to any disclaimer, the term of this patent is extended or adjusted under 35 U.S.C. 154(b) by 638 days.

(21) Appl. No.: 12/581,249

(22) Filed: Oct. 19, 2009

(65) Prior Publication Data

US 2010/0161983 A1    Jun. 24, 2010

(30) Foreign Application Priority Data

Dec. 22, 2008    (KR) ........................ 10-2008-0131020

(51) Int. Cl.
*H04L 12/22*    (2006.01)
*H04L 12/16*    (2006.01)

(52) U.S. Cl.
USPC ......................................... 380/240; 380/242

(58) Field of Classification Search
None
See application file for complete search history.

(56) References Cited

U.S. PATENT DOCUMENTS

| 7,561,694 | B1 * | 7/2009 | Chakrabarti et al. | 380/270 |
|---|---|---|---|---|
| 2004/0215735 | A1 * | 10/2004 | Nakahara et al. | 709/207 |
| 2004/0248514 | A1 * | 12/2004 | Idani et al. | 455/41.2 |
| 2005/0065624 | A1 * | 3/2005 | Ben-Yaacov et al. | 700/94 |
| 2007/0061886 | A1 * | 3/2007 | Le | 726/26 |
| 2007/0150720 | A1 * | 6/2007 | Oh et al. | 713/153 |
| 2007/0201087 | A1 * | 8/2007 | Saito | 358/1.15 |

FOREIGN PATENT DOCUMENTS

| KR | 1020040104778 A | 12/2004 |
|---|---|---|
| KR | 1020060087459 A | 8/2006 |
| KR | 1020070109789 A | 11/2007 |
| KR | 10-0823260 B1 | 4/2008 |
| WO | 2007/083891 A1 | 7/2007 |

OTHER PUBLICATIONS

Jooyoung Lee, et al; "A Study on the Method for Supporting the Personal-usage of Broadcasting Content", Proceedings of Autumn Conference, 2008 Korea Multimedia Society, vol. 11, No. 2, pp. 144, Nov. 21 through 22, 2008 (Friday to Saturday), Inchon Memorial Hall, Korea University.

* cited by examiner

*Primary Examiner* — Venkat Perungavoor
(74) *Attorney, Agent, or Firm* — Ladas & Parry LLP

(57) ABSTRACT

A terminal for reproducing a digital content in support of transmitting/receiving the digital content to/from another terminal based on whether a terminal is registered in a domain and whether a terminal belongs to a person use scope such that the terminal belonging to the person use scope is not registered in the domain.

11 Claims, 6 Drawing Sheets

DIGITAL CONTENTS REPRODUCING TERMINAL AND METHOD FOR SUPPORTING DIGITAL CONTENTS TRANSMISSION/RECEPTION BETWEEN TERMINALS ACCORDING TO PERSONAL USE SCOPE

CROSS-REFERENCE TO RELATED APPLICATIONS

The present invention claims priority of Korean Patent Application No. 10-2008-0131020, filed on Dec. 22, 2008, which is incorporated herein by reference.

BACKGROUND OF THE INVENTION

1. Field of the Invention

The present invention relates to a terminal for reproducing digital contents and a method for transmitting/receiving digital contents; and, more particularly, to a digital contents reproducing terminal and a digital contents transmission/reception method that can prevent digital contents from being illegally copied and distributed.

2. Description of Related Art

Digital contents are data or information obtained by producing and processing code, text, speech, sound, image and video in a digital method. Digital contents include audio-visual contents, such as dramas and movies, and video games. The forms and range of digital contents are expanding constantly.

Since digital contents can be copied easily and quickly and the copy versions maintain the same quality as the original versions, they can be readily distributed through wired/wireless electrical communication networks. Accordingly, distribution of such digital contents through unlawful distribution channels and illegal copying and distribution of the digital contents emerge as problems.

These problems call for Digital Rights Management (DRM) technology, which prevents digital contents from being unlawfully copied and distributed by distributing the digital contents through user authentication and charging processes.

In the initial days, however, the DRM technology obstructs the illegal copy of digital contents on a single device basis. Thus, although a user receives a digital content through a lawful distribution channel, only the device which received the digital content are allowed to use the digital content. In other words, the user cannot use the digital content in another device of his. This infringes on the lawful personal use of the user.

For example, when a user pays a predetermined amount of money and downloads a digital content into his personal computer (PC), he is not allowed to copy and transmit the digital content to his Portable Multimedia Player (PMP). Although the user has a lawful right of using the digital content, he cannot freely use the digital content within the scope the user can use it personally, which will be referred to as a personal use scope hereafter, and this is a problem.

To protect the right of a user personally using a digital content, conventional technology called domain technology was suggested. Domain technology allows a user to register a plurality of devices that belong to the personal use scope of the user, which are terminals owned by the user, in a domain and share a digital content among the registered terminals. Hereafter, the conventional domain technology will be described with reference to the accompanying drawings.

Figure 1:
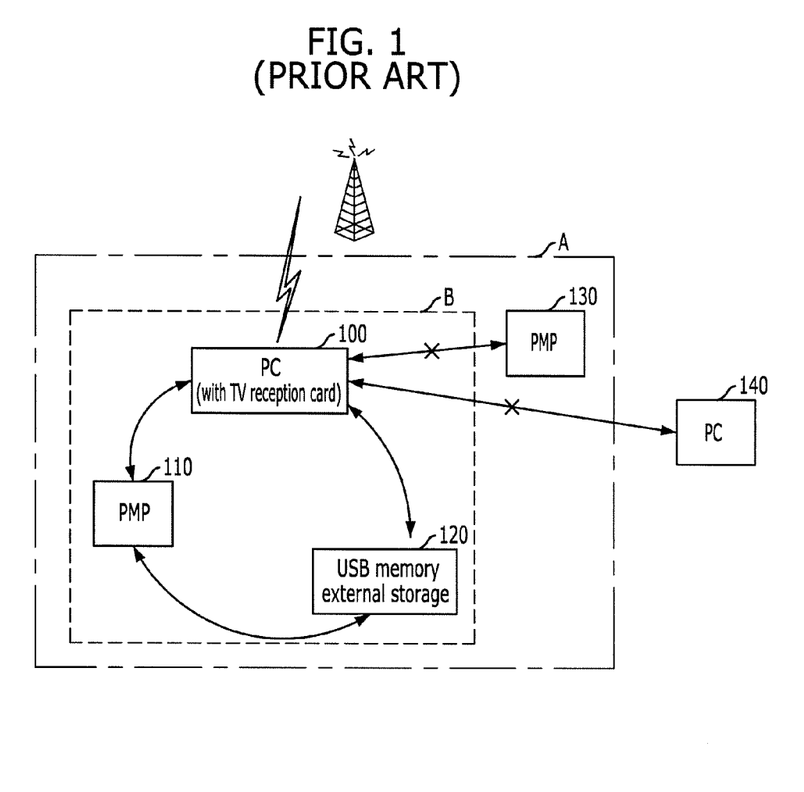
FIG. 1 is a block diagram of conventional domain technology showing whether it is possible to transmit digital contents between terminals according to a personal use scope.

FIG. 1 illustrates a typical domain technology. Particularly, the drawing describes whether a digital content can be transmitted between terminals according to a personal use scope.

As illustrated, a plurality of terminals 100, 110, 120, and 130 may be included in a personal use scope (A) of a user, and some 100, 110 and 120 of them may be registered as a group, i.e., a domain B, based on the domain technology.

The domain technology has two ways of registering devices. First, terminals 100, 110 and 120 that belong to a personal use scope A are registered as a group in a domain registration and management server and the domain registration and management server assigns a domain to the group. Second, a master function is given to any one terminal 100, which will be referred to as a master terminal, among the multiple terminals that belong to a personal use scope A and the master terminal 100 registers the other terminals 110 and 120 of the personal use scope A.

The terminals 100, 110 and 120 registered in the domain B share a domain key. A domain key refers to an encryption key shared by only the terminals 100, 110 and 120 that belong to the domain B. With the domain key, the terminals 100, 110 and 120 can share the digital content.

Figure 2:
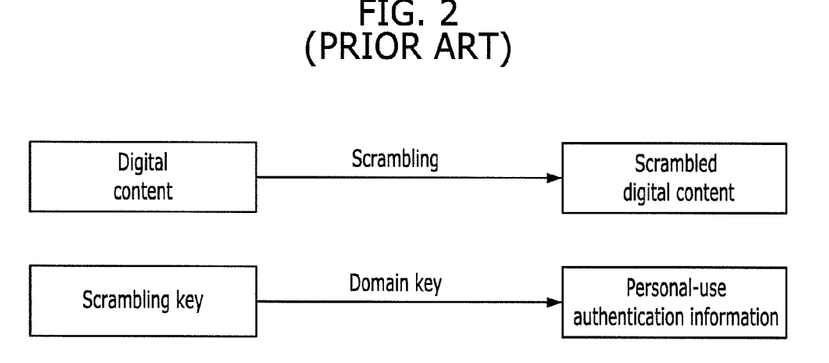
FIG. 2 illustrates how a transmission terminal process data to transmit a digital content between terminals registered in a domain according to a prior art.

FIG. 2 illustrates how data are processed in a transmission terminal when a digital content is transmitted between terminals registered in a domain. Hereafter, it is assumed that a first terminal 100 transmits a digital content to a second terminal 110.

As illustrated, the first terminal 100 scrambles the digital content by using a scrambling key. Also, the first terminal 100 encrypts the scrambling key by using a domain key to thereby generate personal-use authentication information. The personal-use authentication information is information for descrambling the scrambled digital content, and only a terminal with the domain key can use the digital content by using the personal-use authentication information.

The first terminal 100 transmits the scrambled digital content and the personal-use authentication information to the second terminal 110.

The second terminal 110 decrypts the encrypted scrambling key from the personal-use authentication information by using the domain key, and descrambles the scrambled digital content by using the scrambling key. In this way, the digital content is decrypted.

As described above, as the scrambled digital content and the personal-use authentication information are transmitted together when the digital content is requested to be transmitted, it is possible to use the digital content in terminals registered in the domain B, which are allowed to use the digital content.

The conventional domain technology, however, allows only the terminals 100, 110 and 120 registered in the domain B to share the digital content. In other words, a fourth terminal 130, which is within the personal use scope of the user but not registered in the domain B, cannot share the digital content.

For example, a terminal which is not yet registered in the domain B or cannot be registered in the domain B, or a terminal which is designed for one-time use and not appropriate for registration in the domain B cannot use the digital content, even though the terminal is still within the personal use scope A of the user.

In short, the conventional domain technology has a problem of restricting the personal use scope A of the user because it allows the use of the digital content based on whether a terminal is registered in the domain B. Therefore, it is required to develop a technology that can secure the personal use scope of a user regardless of whether a terminal is registered in the domain or not.

SUMMARY OF THE INVENTION

An embodiment of the present invention, which is designed to solve the above problem, is directed to provide a digital contents reproducing terminal capable of supporting transmission/reception of digital contents between terminals of a personal use scope, and a digital contents transmission/reception method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a terminal for reproducing a digital content in support of transmitting/receiving the digital content to/from another terminal including: an encryption unit configured to encrypt the digital content to produce encrypted digital content; a use scope determining unit configured to determine a use scope of a target terminal to which the digital content is to be transmitted; a personal-use authentication information generation unit configured to transform encryption information of the digital content according to a determination result of the use scope determining unit and generate personal-use authentication information; and a communication unit configured to transmit the encrypted digital content and the personal-use authentication information to the target terminal.

In accordance with another aspect of the present invention, there is provided a method for transmitting/receiving a digital content between digital contents reproducing terminals, comprising: encrypting the digital content to produce encrypted digital content; requesting to transmit the digital content to a target terminal; determining a use scope of the target terminal; generating personal-use authentication information by transforming encryption information of the digital content according to the use scope of the target terminal; and transmitting the encrypted digital content and the personal-use authentication information.

DESCRIPTION OF SPECIFIC EMBODIMENTS

The advantages, features and aspects of the invention will become apparent from the following description of the embodiments with reference to the accompanying drawings, which is set forth hereinafter. When it is considered that detailed description on a prior art related to the present invention may obscure a point of the present invention, the description will be omitted. Hereafter, embodiments of the present invention will be described in detail with reference to the accompanying drawings.

Figure 3:
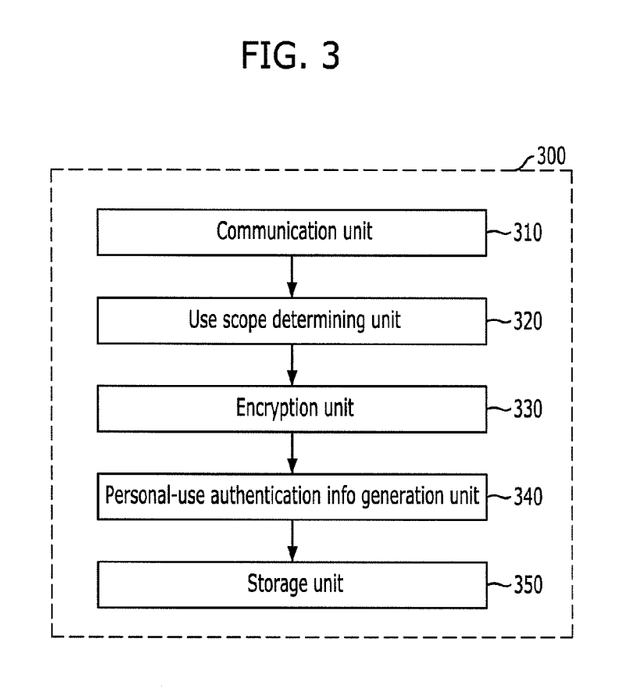
FIG. 3 is a block diagram illustrating a digital contents reproducing terminal in accordance with an embodiment of the present invention.

FIG. 3 is a block diagram illustrating a digital contents reproducing terminal 300 in accordance with an embodiment of the present invention.

As illustrated, the digital contents reproducing terminal 300 includes a communication unit 310, a use scope determining unit 320, an encryption unit 330, and a personal-use authentication information generation unit 340.

The encryption unit 330 encrypts a digital content, and the use scope determining unit 320 determines a use scope of a target terminal to which the digital content is to be transmitted. The personal-use authentication information generation unit 340 transforms encryption information of the digital content according to the determination result of the use scope determining unit 320 and generates personal-use authentication information. The communication unit 310 transmits the encrypted digital content and the personal-use authentication information to the target terminal. Particularly, the digital contents reproducing terminal 300 may further include a storage unit 350 for storing encrypted digital contents, personal-use authentication information for the digital contents, and terminal identification (ID) information of a terminal registered in a personal use group.

The communication unit 310 communicates with the target terminal or a predetermined service to transmit/receive the digital content. For example, it may communicate with a broadcasting station or a digital content distribution server (not shown) to receive a digital content or communicate with terminals within a personal use scope to transmit/receive the encrypted digital content and the personal-use authentication information. Also, the communication unit 310 may communicate with a personal use group management server (not shown) to register a terminal in a personal use group.

The use scope determining unit 320 determines a use scope of the target terminal to which it is trying to send the digital content based on whether the target terminal is registered in the personal use group and whether the target terminal belongs to the personal use scope.

First, the use scope determining unit 320 determines a terminal registered in the personal use group as a terminal belonging to the personal use scope.

Herein, the personal use group stands for a group of terminals registered as terminals belonging to the personal use scope. The terminals registered in the personal use group share a first encryption key. The first encryption key may be a domain key, which is described in the prior art section of this specification. The registration of terminals in the personal use group may be managed by a personal use group management server or by any one terminal among the multiple terminals belonging to the personal use scope, which is given with a master function. The registration and management of a personal use group may be performed based on the above-described domain technology.

Second, although a terminal is not registered in the personal use group, the terminal should be allowed to use the digital content if the terminal is owned by the same user or it is determined as a terminal with an authority to use the digital content. Therefore, when the terminal satisfies a predetermined condition, it is determined as a terminal within the personal use scope.

Herein, the predetermined condition is determined based on whether a terminal is owned by the same user or the same user has an authority to use the terminal, such as a distance between terminals, intensity of electromagnetic waves between terminals, or location of a terminal. For example, when the distance between a transmission terminal and a reception terminal is within a predetermined distance, the use scope determining unit 320 may decide that the reception terminal belongs to the personal use scope. Herein, the predetermined distance is a distance within which both transmission terminal and reception terminal are so close that they can be regarded to belong to the same user.

Third, when the target terminal is not registered in the personal use group and fails to satisfy the predetermined condition, the use scope determining unit 320 determines the target terminal as one out of the personal use scope.

The encryption unit 330 encrypts the digital contents. For example, it may scramble the digital content by using a scrambling key and besides, it may encrypt the digital content through diverse digital contents encryption technologies.

Herein, information indicating how the digital content is encrypted is referred to as encryption information. For example, the scrambling key of a scrambled digital content may be the encryption information.

The personal-use authentication information generation unit 340 transforms the encryption information of the digital content according to a determination result of the use scope determining unit 320 and generates personal-use authentication information.

Herein, the personal-use authentication information is information for allowing the digital content to be used only by the terminal of the personal use scope. The personal-use authentication information is generated by transforming the encryption information through a different method according to the use scope of the target terminal such as whether the target terminal is registered in the personal use group, whether the target terminal belongs to the personal use scope but not registered in the personal use group, or whether the target terminal does not belong to the personal use scope. Therefore, the target terminal receives the personal-use authentication information and decrypts the encryption information by using a different encryption key according to its use scope.

First, when the target terminal is registered in the personal use group, the personal-use authentication information generation unit 340 generates personal-use authentication information including group authentication information for the personal use group.

Herein, since the terminals of the personal use group share a first encryption key, the group authentication information may be generated by using the first encryption key to encrypt the encryption information of the digital content.

Second, when the target terminal belongs to the personal use scope but is not registered in the personal use group, the personal-use authentication information generation unit 340 generates the personal-use authentication information including terminal authentication information for the target terminal. In short, the personal-use authentication information generation unit 340 generates authentication information dedicated to the target terminal so that the target terminal could use the digital content.

Herein, since the target terminal includes its own encryption key, which is referred to as a second encryption key, the terminal authentication information may be generated by using the second encryption key to encrypt the encryption information of the digital content.

Third, when the target terminal does not belong to the personal use scope, the target terminal is regarded not to have any authority to use the digital content. Therefore, the personal-use authentication information generation unit 340 may not generate the personal-use authentication information. Even though it generates personal-use authentication information, the target terminal cannot decrypt the personal-use authentication information and thus the target terminal cannot use the digital content.

Herein, the personal-use authentication information generation unit 340 checks whether the personal-use authentication information includes terminal authentication information to prevent the target terminal which has received the digital content from re-copying and transmitting the digital content out of the personal use scope. If the personal-use authentication information includes terminal authentication information, it does not allow the personal-use authentication information from being generated to restrict copying the digital content.

The storage unit 350 stores the encrypted digital content, the personal-use authentication information of the digital content, and a list of identifications of the terminals registered in the personal use group. Therefore, the use scope determining unit 320 can figure out whether the target terminal is registered in the personal use group or not by comparing the identification information of the target terminal with the list of the terminals registered in the personal use group.

When the storage unit 350 does not have a list of identification information of the terminals registered in the personal use group, the use scope determining unit 320 requests the target terminal for registered domain information, and thereby check whether the target terminal is registered in the personal use group or not based on the response information from the target terminal.

Figure 4:
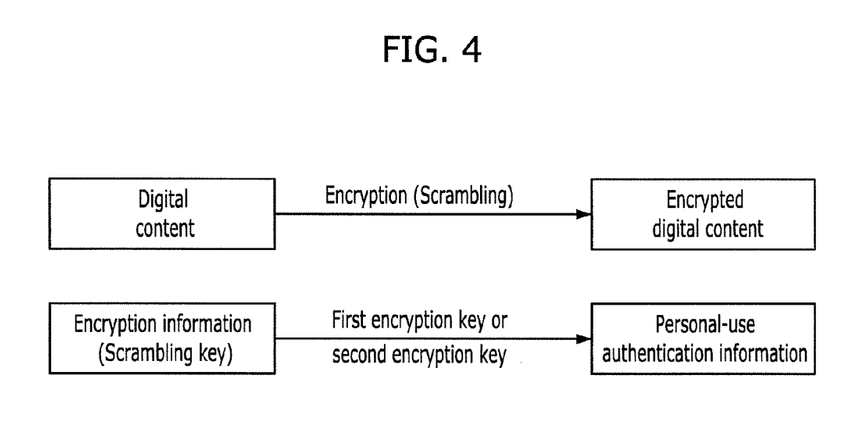
FIG. 4 illustrates how a transmission terminal processes data when a digital content is transmitted between terminals in accordance with an embodiment of the present invention.

FIG. 4 illustrates how a transmission terminal processes data when a digital content is transmitted between terminals in accordance with an embodiment of the present invention.

As shown in the drawing, the encryption unit 330 encrypts the digital content. For example, the encryption unit 330 may scramble the digital content by using a scrambling key. In this case, the scrambling key may be regarded as the encryption information of the digital content.

Also, when the target terminal is registered in the personal use group, the personal-use authentication information generation unit 340 encrypts the encryption information, which is the scrambling key. When the target terminal belongs to the personal use scope but is not registered in the personal use group, the encryption unit 330 encrypts the encryption information, which is the scrambling key, by using a second encryption key to generate the personal-use authentication information.

Figure 5:
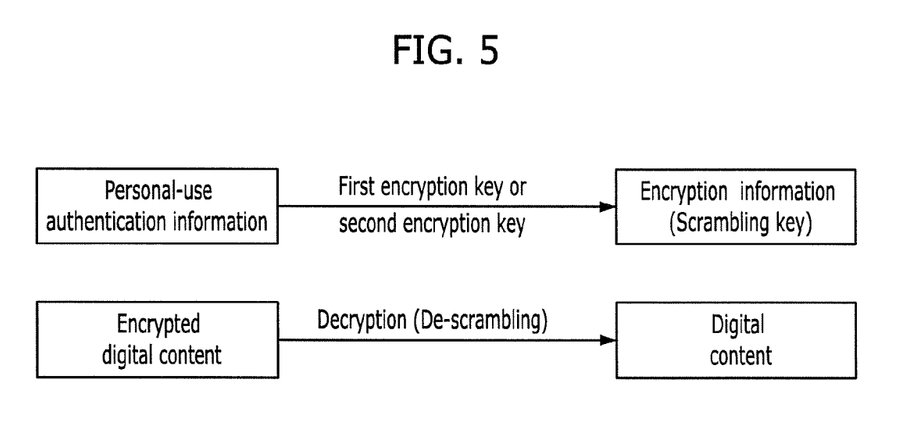
FIG. 5 illustrates how a reception terminal processes data when a digital content is transmitted between terminals in accordance with an embodiment of the present invention.

FIG. 5 illustrates how a reception terminal processes data when a digital content is transmitted between terminals in accordance with an embodiment of the present invention.

When the encrypted digital content and the personal-use authentication information are received, the encryption information is decrypted from the personal-use authentication information. When the reception terminal is a terminal registered in the personal use group, the first encryption key is used for the decryption. When the reception terminal belongs to the personal use scope but is not registered in the personal use group, the second encryption key is used for the decryption.

Subsequently, the reception terminal may decrypt the digital content by using the encryption information. For example, if the digital content was scrambled using the scrambling key, it may be descrambled to be decrypted.

Herein, a terminal out of the personal use scope cannot decrypt the encryption information from the personal-use authentication information, because it has neither first encryption key nor second encryption key. Therefore, although the terminal out of the personal use scope receives an encrypted data content, it cannot use the content.

Figure 6:
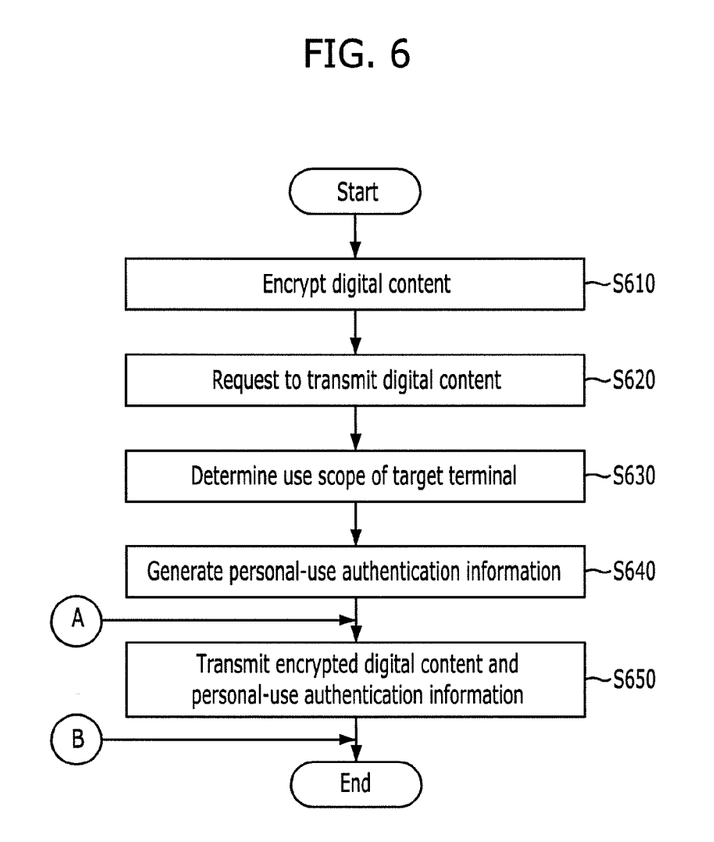
FIG. 6 is a flowchart describing a method for transmitting digital contents in accordance with an embodiment of the present invention.

FIG. 6 is a flowchart describing a method for transmitting digital contents in accordance with an embodiment of the present invention. It illustrates a data processing in a transmission terminal. Herein, the details of the digital contents transmission/reception method are the same as described with reference to FIGS. 3 to 5.

First, when a digital content is received through the communication unit 310, the received digital content is encrypted in the encryption unit 330 at step S610 and encrypted digital content is stored in the storage unit 350.

At step S620, the digital content is requested to be transmitted to another terminal, which will be referred to as a target terminal. Herein, a user of the transmission terminal may directly request to transmit the digital content to the target terminal, or the target terminal may request the transmission terminal to send the digital content through the communication unit 310.

At step S630, the use scope determining unit 320 determines the use scope of the target terminal, and at step S640, the personal-use authentication information generation unit 340 transforms encryption information of the digital content according to the determination result of the use scope determining unit 320 and thereby generates personal-use authentication information.

At step S650, the encrypted digital content and the personal-use authentication information are transmitted through the communication unit 310.

Herein, when the personal-use authentication information is generated using the first encryption key, the personal-use authentication information may be generated in advance_regardless of when the digital content is copied.

Figure 7:
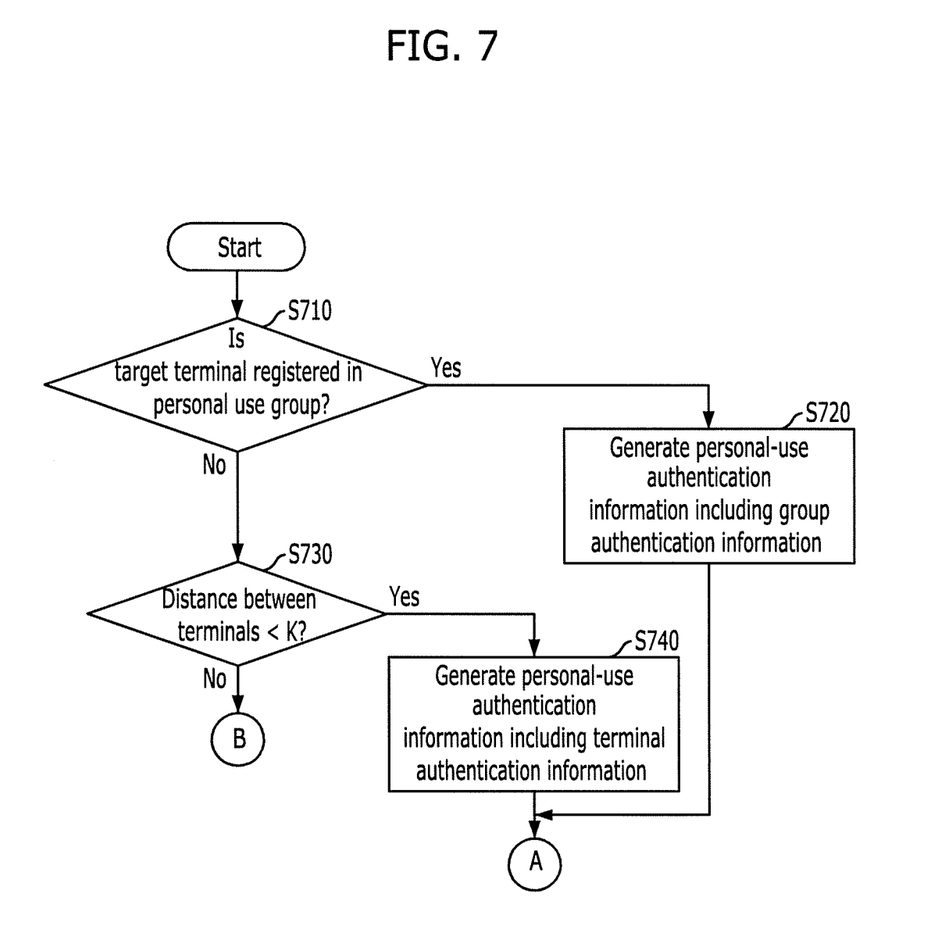
FIG. 7 is a flowchart describing a method for determining a use scope and generating personal-use authentication information.

FIG. 7 is a flowchart describing a method for determining a use scope and generating personal-use authentication information. This flow corresponds to the steps S620 and S630 of FIG. 6. Details of the determination of the use scope and the generation of the personal-use authentication information are the same as described with reference to FIGS. 3 to 5.

First, at step S710, the use scope determining unit 320 checks whether the target terminal is registered in the personal use group. When the target terminal is registered in the personal use group, at step S720, the personal-use authentication information generation unit 340 generates personal-use authentication information including group authentication information.

At step S730, when the target terminal is not registered in the personal use group, it is checked whether the distance between the transmission terminal and the target terminal is within a predetermined distance (K). When the distance between the two terminals is within a predetermined distance (K), at step S740, the personal-use authentication information generation unit 340 generates personal-use authentication information including terminal authentication information. When the distance between the two terminals is farther than the predetermined distance (K), the use scope determining unit 320 determines that the target terminal is out of the personal use scope and terminates the process of transmitting/receiving the digital content.

Figure 8:
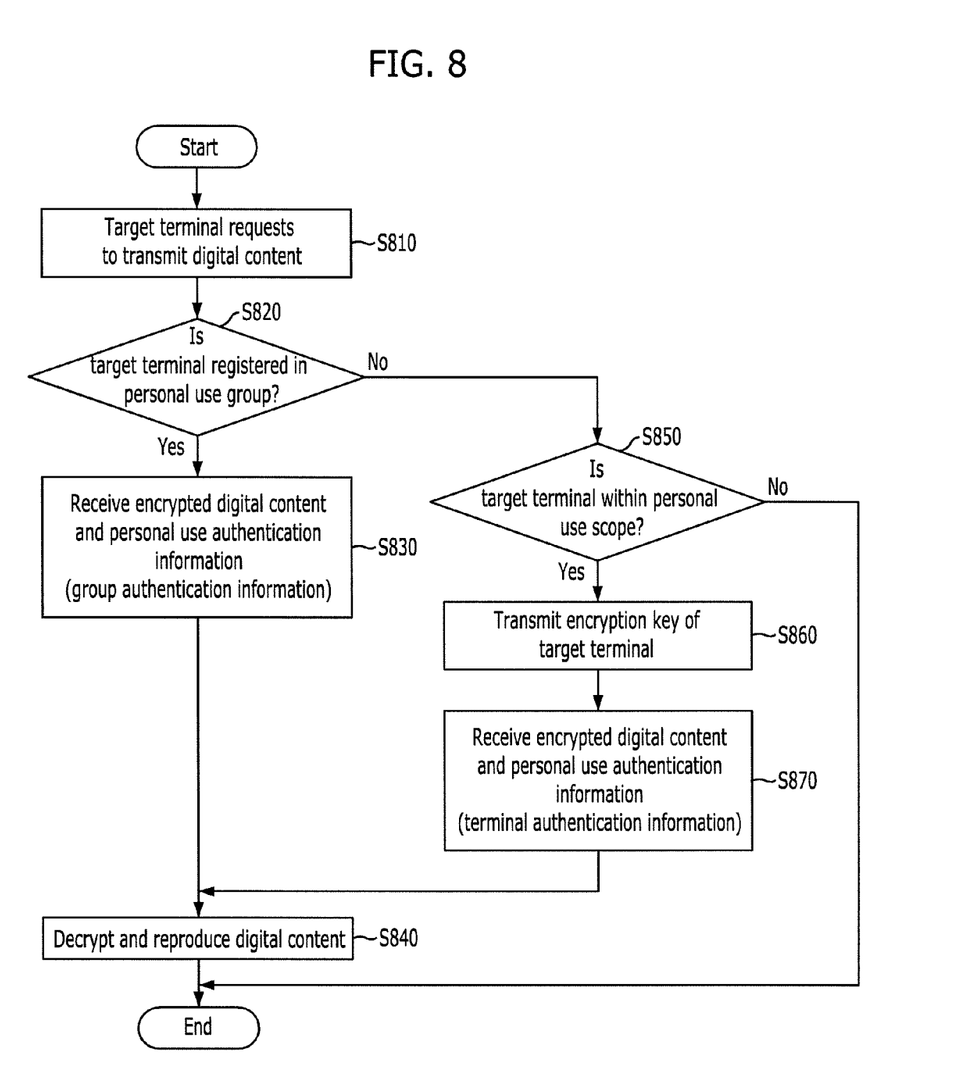
FIG. 8 is a flowchart describing a method for receiving digital contents in accordance with another embodiment of the present invention.

FIG. 8 is a flowchart describing a method for receiving digital contents in accordance with another embodiment of the present invention. The drawing shows a data processing in a reception terminal. Hereafter, when a first terminal requests a second terminal to transmit a digital content to the first terminal, the first terminal goes through the following process.

First, at step S810, the first terminal requests the second terminal, which has the digital content, to transmit the digital content to the first terminal.

When it is turned out at step S820 that both first terminal and second terminal are registered in the same personal use group, the first terminal receives encrypted digital content and personal-use authentication information including group authentication information encrypted based on a first encryption key at step S830.

At step S840, encryption information of the digital content is decrypted based on the first encryption key from the group authentication information and the digital content is decrypted and reproduced by using the decrypted encryption information.

When it is turned out at steps S820 and S850 that the first terminal is not registered in the personal use group of the second terminal but belongs to the same personal use scope as the second terminal does, at step S860, a security channel is formed between the first terminal and the second terminal and the first terminal transmits a second encryption key, which is unique to the first terminal, to the second terminal.

At step S870, the first terminal receives from the second terminal encrypted digital content and personal-use authentication information including terminal authentication information which is encrypted using the second encryption key.

Subsequently, at step S840, the encryption information of the digital content is decrypted from the terminal authentication information by using the second encryption key, and the digital content is decrypted and reproduced by using the decrypted encryption information.

When the first and second terminals are not registered in the same personal use group and do not belong to the personal use scope, the reception process of the digital content is terminated.

Figure 9:
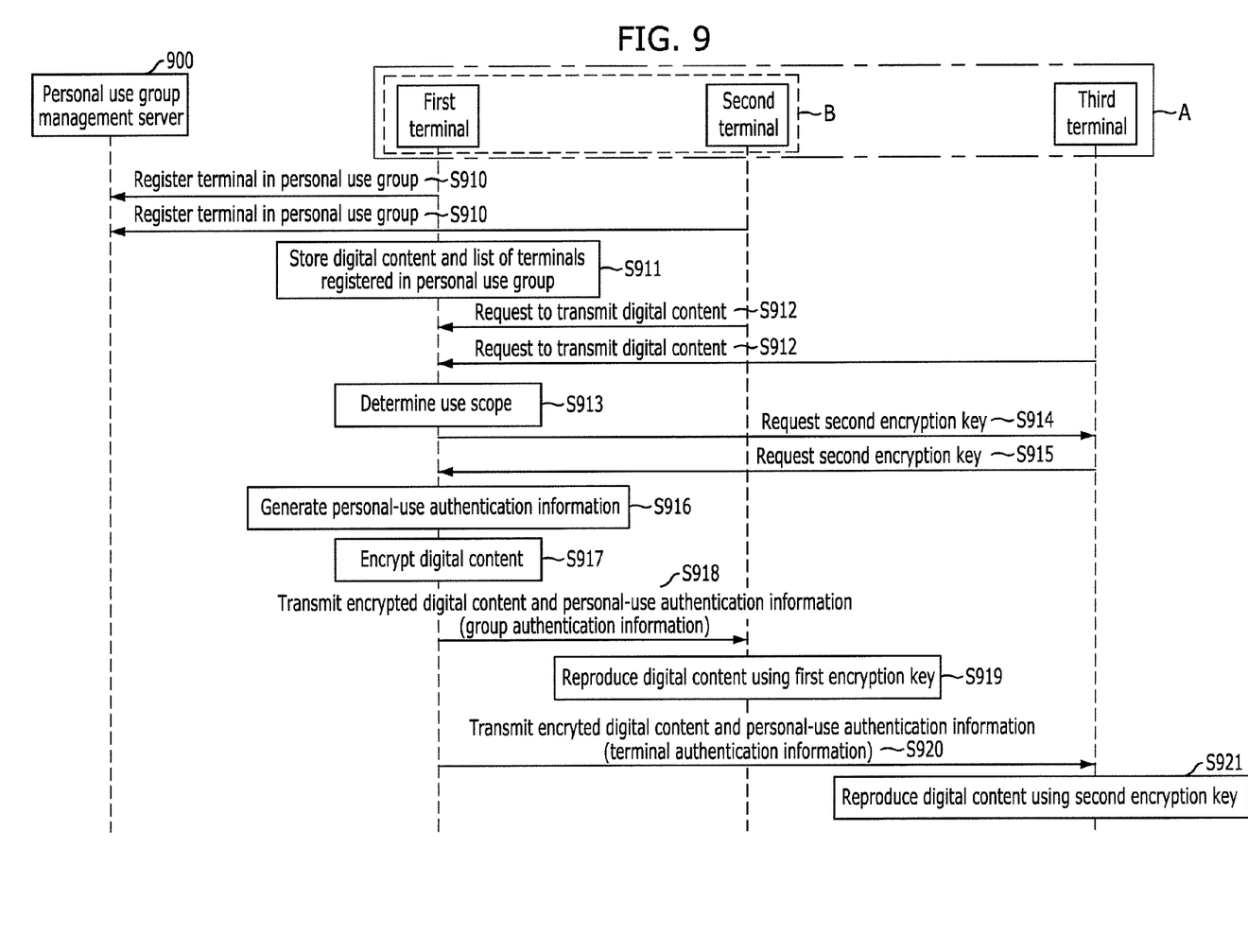
FIG. 9 is a flowchart describing a method for transmitting/receiving digital contents in accordance with another embodiment of the present invention.

FIG. 9 is a flowchart describing a method for transmitting/receiving digital contents in accordance with another embodiment of the present invention. Details of the digital contents transmission/reception method are the same as described before with reference to FIGS. 3 to 5. Hereafter, a case where only some of the terminals belonging to the personal use scope (A) are registered in the personal use group will be described. First to third terminals belong to the personal use scope (A) and among them, only the first and second terminals are registered in the personal use group.

First, at step S910, the first and second terminal are registered in a personal use group management server 900 as a personal use group. Herein, the personal use group management server 900 allocates a domain to the personal use group to which the first and second terminal belong, and the first and second terminals share a first key, e.g., a domain key.

At step S911, the first terminal stores in the storage unit 350 the digital content and a list of terminals registered in the personal use group.

Subsequently, when the second terminal and the third terminal request the first terminal to transmit the digital content to them at step S912, the first terminal determines the use scopes of the second and third terminals in the use scope determining unit 320 at step S913.

Since the second terminal is found out to be registered in the personal use group, the personal-use authentication information generation unit 340 generates personal-use authentication information including group authentication information by using the first encryption key at step S916.

Since the third terminal is found out to be within the personal use scope but not registered in the personal use group, the first terminal requests the third terminal to send a second encryption key, which is unique to the third terminal, to the first terminal at step S914. At step S915, the third terminal transmits the second encryption key, which is its own encryption key, to the first terminal. Subsequently, at step S916, the personal-use authentication information generation unit 340 of the first terminal generates personal-use authentication information including terminal authentication information by using the second encryption key.

At step S917, the encryption unit 330 encrypts the digital content.

At step S918, the first terminal transmits the encrypted digital content and the personal-use authentication information including group authentication information to the second terminal through the communication unit 310. At step S919, the second terminal receives the encrypted digital content and the personal-use authentication information including group authentication information and decrypts and reproduces the digital content by using the first encryption key at step S919.

Also, at step S920, the first terminal transmits the encrypted digital content and the personal-use authentication information including terminal authentication information to the third terminal through the communication unit 310. The third terminal receives the encrypted digital content and the personal-use authentication information including terminal authentication information, and decrypts and reproduces the digital content by using the second encryption key at step S921.

According to the embodiments of the present invention described above, it is possible to allow a terminal which is within a personal use scope but not registered as a personal use group to use a digital content by transforming encryption information of the digital content according to the use scope of a target terminal and generating personal-use authentication information to transmit the digital content.

Particularly, when a target terminal is registered in a personal use group, personal-use authentication information including group authentication information is generated and transmitted along with an encrypted digital content. When a terminal belongs to a personal use scope but is not registered in a personal use group of the personal use scope, personal-use authentication information including terminal authentication information is generated and transmitted along with an encrypted digital content.

Through this process, it is possible to support transmission/reception of digital contents between the terminals of a personal use scope, regardless of whether a terminal is registered in a personal use group or not.

The method of the present invention described above may be realized as a program and stored in a computer-readable recording medium such as CD-ROM, RAM, ROM, floppy disks, hard disks, and magneto-optical disks. Since this process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A terminal for reproducing a digital content in support of transmitting/receiving the digital content to/from another terminal, comprising:
   an encryption unit having a processor configured to encrypt the digital content to produce encrypted digital content;
   a use scope determining unit configured to determine a use scope of a target terminal to which the digital content is to be transmitted, and
   wherein the another terminal transmits/receives the digital content to at least a target terminal registered in a personal use group and a target terminal belonging to a personal use scope,
   wherein the target terminal belonging to the personal use scope is not registered in the personal use group, and
   wherein when the target terminal is not registered in the personal use group and belonging to the personal use scope then the target terminal is able to receive the reproduced digital content in a same form that the digital content was received by the terminal;
   a personal-use authentication information generation unit configured to transform encryption information of the digital content according to a determination result of the use scope determining unit and generate personal-use authentication information; and
   a communication unit configured to transmit the encrypted digital content and the personal-use authentication information to the target terminal.

2. The terminal of claim 1, wherein the use scope determining unit determines the use scope of the target terminal based on whether the target terminal is registered in the personal use group and whether the target terminal belongs to the personal use scope.

3. The terminal of claim 2, wherein the use scope determining unit determines that the target terminal belongs to the personal use scope when a distance between a transmission terminal and the target terminal is within a predetermined distance.

4. The terminal of claim 1, wherein when the target terminal is registered in the personal use group, the personal-use authentication information generation unit generates personal-use authentication information including group authentication information for the personal use group; and when the target terminal belongs to the personal use scope but is not registered in the personal use group, the personal-use authentication information generation unit generates personal-use authentication information including terminal authentication information for the target terminal.

5. The terminal of claim 4, wherein the group authentication information is generated by encrypting the encryption information of the digital content based on a first encryption key shared by terminals registered in the personal use group, and
   the terminal authentication information is generated by encrypting the encryption information of the digital content based on a second encryption key, which is unique to the target terminal.

6. A method for transmitting/receiving a digital content between digital contents reproducing terminals, comprising:
   providing a processor and a memory, the memory having stored thereon instructions to execute the steps of:
   encrypting the digital content to produce encrypted digital content;

requesting to transmit the digital content to a target terminal;

determining a use scope of the target terminal;

generating personal-use authentication information by transforming encryption information of the digital content according to the use scope of the target terminal; and transmitting the encrypted digital content and the personal-use authentication information, wherein at least one of the digital contents reproducing terminals transmit the encrypted digital content to at least a first target terminal registered in a personal use group and a second target terminal not belonging to a personal use group, wherein when the first target terminal is not registered in the personal use group and belongs to the personal use scope then the first target terminal is able to receive the reproduced digital content in a first form that the digital content was received by the second terminal, and wherein the second terminal is registered to lawfully receive the digital content in the first form from at least one of a broadcasting station and a digital content distribution server.

7. The method of claim 6, wherein in said determining a use scope of the target terminal, the use scope of the target terminal is determined based on whether the target terminal is registered in the personal use group and whether the target terminal belongs to a personal use scope.

8. The method of claim 6, wherein in said determining a use scope of the target terminal, the target terminal is determined to belong to the personal use scope when a distance between a transmission terminal and the target terminal is within a predetermined distance.

9. The method of claim 6, wherein in said generating personal-use authentication information, when the target terminal is registered in the personal use group, personal-use authentication information including group authentication information for the personal use group is generated; and when the target terminal belongs to the personal use scope but is not registered in the personal use group, personal-use authentication information including terminal authentication information for the target terminal is generated.

10. The method of claim 9, wherein the group authentication information is generated by encrypting the encryption information of the digital content based on a first encryption key shared by terminals registered in the personal use group, and the terminal authentication information is generated by encrypting the encryption information of the digital content based on a second encryption key, which is unique to the target terminal.

11. A terminal for reproducing a digital content in support of transmitting/receiving the digital content to/from another terminal, comprising:

an encryption unit having a processor configured to encrypt the digital content to produce encrypted digital content;

a use scope determining unit configured to determine a use scope of a plurality of target terminals to which the digital content is to be transmitted, wherein the use scope determining unit determines the use scope of the target terminal based on whether the target terminal is registered in a personal use group and whether the target terminal belongs to a personal use scope, and wherein when the target terminal is not registered in the personal use group and belonging to the personal use scope then the target terminal is able to receive the reproduced digital content in a same form that the digital content was received by the terminal;

a personal-use authentication information generation unit configured to transform encryption information of the digital content according to a determination result of the use scope determining unit and generate personal-use authentication information; and a communication unit configured to transmit the encrypted digital content and the personal-use authentication information to the target terminal, and wherein the communication unit is configured to transmit the encrypted digital content to at least the target terminal registered in a personal use group and the target terminal belonging to a personal use scope.

* * * * *